N. BURR.
Combined Corn Sheller and Grinding Mill.
No. 26,010. Patented Nov. 8, 1859.
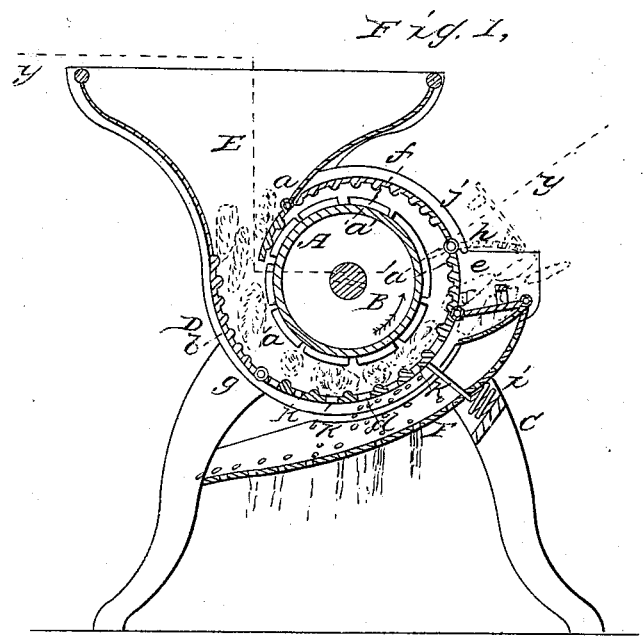
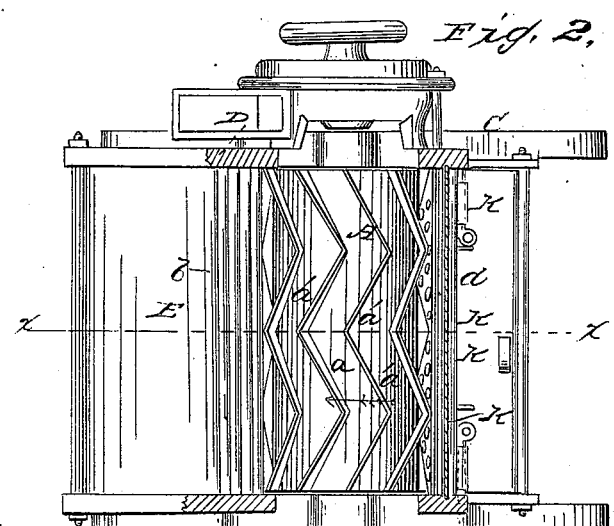
Witnesses:
Edw¹ S. Smith
C. H. Munn
Inventor:
Nelson Burr
N. PETERS, Photo-Lithographer, Washington, D. C.

UNITED STATES PATENT OFFICE.

NELSON BURR, OF BATAVIA, ILLINOIS.

CORN-SHELLER.

Specification of Letters Patent No. 26,010, dated November 8, 1859.

*To all whom it may concern:*

Be it known that I, NELSON BURR, of Batavia, in the county of Kane and State of Illinois, have invented a new and Combined Corn-Sheller and Corn and Cob Grinding Mill; and I do hereby declare that the following is a full, clear, and exact description of the same, reference being had to the annexed drawings, making a part of this specification, in which—

Figure 1 is a side sectional view of my invention taken in the line x x, Fig. 2. Fig. 2 is a section of ditto, taken in the line y y, Fig. 1.

Similar letters of reference indicate corresponding parts in the two figures.

This invention consists in a peculiar arrangement of the shell, the latter being provided with a door and wing, and the whole arranged as hereinafter described, whereby a very simple and efficient combined corn sheller and cob grinding mill is obtained, the machine being rendered capable of being used in either capacity by a very simple adjustment.

To enable those skilled in the art to fully understand and construct my invention I will proceed to describe it.

A represents a cylinder, the axis or shaft, B, of which is placed on a suitable framing, C. The cylinder, A, is inclosed by a scroll-shaped case, D, the form of a transverse section of which is shown clearly in Fig. 1. It will be seen by referring to Fig. 1 that the larger end or orifice of the scroll-passage, between the cylinder and shell, communicates with a hopper, E, and that the inner side of case, D, at the smaller end of the scroll passage is nearly in contact with the cylinder, as shown at a, in Fig. 1.

The cylinder, A, is of cast iron, extends the whole length of case, D, and is provided at its periphery with parallel zig-zag projections, a', as shown clearly in Fig. 2.

The case, D, is formed of longitudinal sections, b, d, e, f. The sections, b f, are stationary or permanently attached to the framing, C, but the sections, d e, are hinged at one end, as shown respectively at g and h. The section, d, has spiral springs, i, bearing against its outer end, the hinge and springs admitting of a requisite degree of play, or adjustment of said section. The section, e, serves as a door and it has a wing, j, at its inner end, which wing at certain times serves as a partition, as will be presently shown.

The inner surfaces of the sections, b e f, are fluted or corrugated longitudinally on their inner surfaces, but are not perforated, while the section, d, is both corrugated and perforated, the perforations being designated by k. Directly below the case, D, there is an inclined perforated apron, F, as shown clearly in Fig. 1.

The operation is as follows:—When corn is to be shelled the attendant raises the section, e, to the position as shown in red, Fig. 1. The ears of corn, also shown in red, are placed in the hopper, E, and motion is given the cylinder, A, in the direction indicated by the arrow. The ears are forced around in the lower part of the passage between the cylinder, A, and case, D, by the action of the cylinder, A, and the corn is shelled from the cob, the corn passing through the perforations, k, of the section, d, of the case, while the cobs pass out of the opening made by the elevation of the section, e. The wing, j, it will be seen, when the section, e, is elevated serves as a partition, and prevents the cobs passing up between the section, f, and cylinder. In order to crush or grind the cobs the section, e, is closed as shown in blue tint Fig. 1, and the cobs will consequently be carried upward between the section, f, and cylinder, A, and crushed or ground, the crushed cobs falling into the orifice of the passage at the bottom of the hopper, E, and, passing down, escape through the perforations, k, of section, d, of the case. The corn and crushed cobs fall on the apron, F, the perforations of which allow all dust and dirt to pass through the corn and crushed cobs falling from the depressed or lowerend of the apron, F. In certain cases when the corn and cob require to be still further reduced in fineness a small mill, G, may be attached to one end of the machine as shown in Fig. 2. This however forms no part of my invention.

It will be seen that the section, d, of the case, D, is allowed to yield or give in order to compensate for the varying sizes of the ears of corn. This however in itself is not new as the generality of concaves of shelling machines are made yielding in order to effect the same result. When however the cobs are to be crushed the yielding of section, d, is not required, and when the section, e, is closed its lower end projects underneath d, and neutralizes the action of the springs, $t$,—see Fig. 1.

I do not claim the rotating cylinder in connection with the scroll-shaped case, for they have been previously used, but,

Having thus described my invention, what I claim as new, and desire to secure by Letters Patent, is:—

The peculiar arrangement of the section, $e$, provided with the wing, $j$, and placed relatively with the cylinder, A, and adjoining sections, $d$, $f$, to effect the object herein set forth, substantially as described.

NELSON BURR.

Witnesses:
 EDWD. S. SMITH,
 C. N. BROWN.